United States Patent [19]

Pyburn et al.

[11] Patent Number: 5,614,338
[45] Date of Patent: Mar. 25, 1997

[54] PROCESS FOR MANUFACTURING BACKLIT DISPLAYS UTILIZING TREATED PLASTICS AND LASER ENERGY

[75] Inventors: Robert A. Pyburn, Carmel; Michael E. Fye, Kokomo, both of Ind.

[73] Assignee: Delco Electronics Corporation, Kokomo, Ind.

[21] Appl. No.: 422,398

[22] Filed: Apr. 14, 1995

[51] Int. Cl.⁶ .................................................. G03C 5/00
[52] U.S. Cl. .................. 430/13; 430/346; 430/320; 430/321; 430/945; 264/1.37; 264/482; 219/121.66; 219/121.85; 362/30
[58] Field of Search ............................. 430/4, 5, 13, 17, 430/346, 945, 321, 320; 264/1.37, 132, 25; 219/121.66, 121.85; 362/30

[56] References Cited

U.S. PATENT DOCUMENTS

| | | | |
|---|---|---|---|
| 3,694,945 | 10/1972 | Detiker | 40/133 R |
| 4,729,067 | 3/1988 | Ohe | 362/26 |
| 5,432,684 | 7/1995 | Fye et al. | 362/30 |
| 5,477,024 | 12/1995 | Share et al. | 219/121.69 |

FOREIGN PATENT DOCUMENTS

| | | |
|---|---|---|
| 1-319573 | 12/1989 | Japan . |
| 4-113388 | 4/1992 | Japan . |

*Primary Examiner*—John A. McPherson
*Attorney, Agent, or Firm*—Jimmy L. Funke

[57] ABSTRACT

A method is provided for producing a graphic for a backlit component, such as a button for an illuminated graphic display of an automobile instrument panel. The method involves a process by which molded plastic backlit buttons are manufactured without the use of hazardous chemicals or materials, and instead utilizes laser energy to produce substantially opaque regions on the button for forming a graphics image. Backlit buttons are preferably formed from a substantially transparent polymeric material in which is present pigmentation that is reactive to laser energy. A graphic image is then created on the button by selectively exposing a portion of the backlit component to laser energy. As a result, the exposed portion becomes substantially opaque while remaining portions of the backlit component remain substantially transparent. As such, the exposed and unexposed portions of the button cooperate to produce the graphic image when the button is backlit with a suitable light source.

20 Claims, 1 Drawing Sheet

PROCESS FOR MANUFACTURING BACKLIT DISPLAYS UTILIZING TREATED PLASTICS AND LASER ENERGY

The present invention generally relates to illuminated graphic displays and buttons used within an instrument panel of an automobile. More particularly, this invention relates to a process by which a graphic image is created in a molded plastic component by formulating the component to include pigmentation that becomes opaque upon exposure to laser energy, such that exposed portions of the component generate a graphic image when the component is backlit.

BACKGROUND OF THE INVENTION

Instrument panels of the type used in automotive applications are often composed of a number of keys or buttons having insignias that identify the particular function of each button. The insignias can be formed in various ways, depending on the application and whether the instrument panel is backlit or not. For example, the insignias can be formed by directly printing an ink onto the displayed surface of the button. Other known methods include forming the insignia during the molding of the button, such as by an in-molded decoration foil or an insert-molded film. Still another method uses conventional paint and laser technologies. This method generally involves forming the button from a white material or painting the surface of the button white, and then coating the surface of the button with an opaque paint so as to conceal the white surface of the button. A portion of the opaque paint is then lased away to expose the underlying white surface of the button, thereby forming an insignia.

Backlit buttons are often employed because of their enhanced visibility at nighttime. Their backlit capability necessitates that they be able to transmit light from a light source behind the instrument panel to the insignia. The manufacture of backlit buttons can be typically accomplished using any of the previously described processes, except that the button must be first molded from a substantially transparent material. Commonly used transparent materials include polycarbonate and acrylic resins.

To affect the manner in which light is transmitted through the button, it is known to disperse various materials within the resin. For example, U.S. Pat. No. 4,729,067 to Ohe teaches a button that includes a transparent substrate and a light diffusing layer composed of an acrylic resin matrix in which is dispersed a light diffusing agent.

While the above manufacturing methods are widely accepted and employed in the art, each has the disadvantage of using hazardous liquid chemicals either directly, such as during the creation of the graphic in the button, or indirectly, such as in the manufacture of an intermediate decoration or insert. For example, paint and laser techniques require a painting operation, and printing techniques require paint-like chemicals, each of which involves the use of solvents and volatile substances that can pose a health hazard. Furthermore, in-mold decoration foils and insert-molded films are manufactured with inks and coatings containing volatile organics that must also be carefully controlled in the manufacturing environment due to their harmful nature.

Another drawback of the processes noted above is that they each tend to complicate the manufacture of a backlit button. For example, printing techniques require dedicated printing equipment and a firing operation. Paint and laser methods require at minimum a coating step and a drying or curing step, while in-mold decoration foils and insert-molded films add an additional step to the molding process. These additional processing steps undesirably contribute to the manufacturing and material costs of a backlit button.

Accordingly, it would be desirable if a process existed by which graphics for backlit buttons could be produced without necessitating the use of hazardous liquid chemistries, coatings, paints or inks. Furthermore, it would be desirable if such a process were relatively uncomplicated, requiring minimal equipment and processing steps to produce a finished backlit button.

SUMMARY OF THE INVENTION

It is an object of this invention to provide a method by which plastic backlit buttons can be readily mass-produced without the use of hazardous liquid chemistries, coatings, paints and inks.

It is a further object of this invention to provide a method in which such backlit buttons are molded from a substantially transparent polymeric material in which is dispersed pigmentation that is reactive to laser energy, such that exposure of the polymeric material to laser energy reduces its transparency.

It is another object of this invention that such a method entail selectively exposing a backlit button to laser energy so as to produce substantially opaque regions on the button that create a graphics image for the button.

It is yet another object of this invention that such a method enable the creation of a graphics image with either the exposed or unexposed portions of the button.

In accordance with a preferred embodiment of this invention, these and other objects and advantages are accomplished as follows.

According to the present invention, there is provided a method for producing a graphic for a backlit component, such as a button for an illuminated graphic display of an automobile instrument panel. In particular, the method involves a process by which molded plastic backlit buttons can be manufactured without the use of hazardous chemicals or materials, and instead utilizes laser energy to produce substantially opaque regions on the button for forming a graphics image.

The method of this invention generally involves forming a backlit button from a substantially transparent polymeric material in which pigmentation is present. According to the invention, the pigmentation is selected to be of a type that is reactive to laser energy, meaning that the pigment particles dispersed in the polymeric material have a high absorption coefficient to the wavelength of a particular laser light. When exposed to the light energy, localized overheating occurs around the pigment particles, darkening the transparent polymeric material immediately surrounding the pigment particles so as to create a contrasting graphic image in the polymeric material. A suitable pigmentation is mica, with or without white (typically titanium dioxide) and/or black (typically carbon black or iron oxide) pigments, in which the pigmentation is present in the polymeric material in quantities of about 0.1 to about 10 weight percent.

A graphic image is then created on the button by selectively exposing one of its surfaces to laser energy from a suitable source, such as a Nd:YAG (neodymium yttrium-aluminum-garnet) or $CO_2$ (carbon dioxide) laser. As a result, exposed portions of the button become substantially opaque while remaining portions of the button remain substantially transparent. As such, the exposed and unexposed portions of the button cooperate to produce the graphic image when the button is backlit with a suitable light source.

Preferably, prior to exposure to laser energy, the button is designated to have a front surface that will be visible when the button is installed within its display, and a back surface that will face the light source after installation. Only one of these surfaces, and preferably the back surface, need be exposed to the laser beam during treatment in order to form the graphic image. Advantageously, either the exposed portions or the unexposed portions can be defined on the surface of the button to form an insignia for the graphic image. Furthermore, the button and treatment can be such that the graphic will not be visible unless the button is backlit with a light source. Alternatively, the button and treatment can be such that the graphic is visible for daytime viewing even if the button is not backlit.

From the above, it can be appreciated that the method of this invention produces a backlit component without the use of any hazardous chemicals or substances that contain hazardous ingredients. Instead of relying on paints, inks or coatings to create a graphics image, the method of this invention utilizes the unique reactivity of certain pigmentation to laser energy.

Advantageously, such pigmentation has been found to generate sufficiently opaque regions on a button upon exposure to laser energy, while being present in sufficiently small quantities so as to have minimal effect on the transparency of the unexposed portions of the button.

Furthermore, the method of this invention avoids additional processing steps, such as printing, drying, coating and curing steps generally entailed by prior art methods. In addition, the method of this invention does not require the use of in-mold decoration foils or insert-molded films, such that the button can be produced using uncomplicated molding techniques. Preparation of the mold material generally involves only the dispersion of the pigmentation within the polymeric material, an entirely conventional and uncomplicated procedure. As a result, buttons requiring different graphic images can be molded with the same mold and subsequently finished individually.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
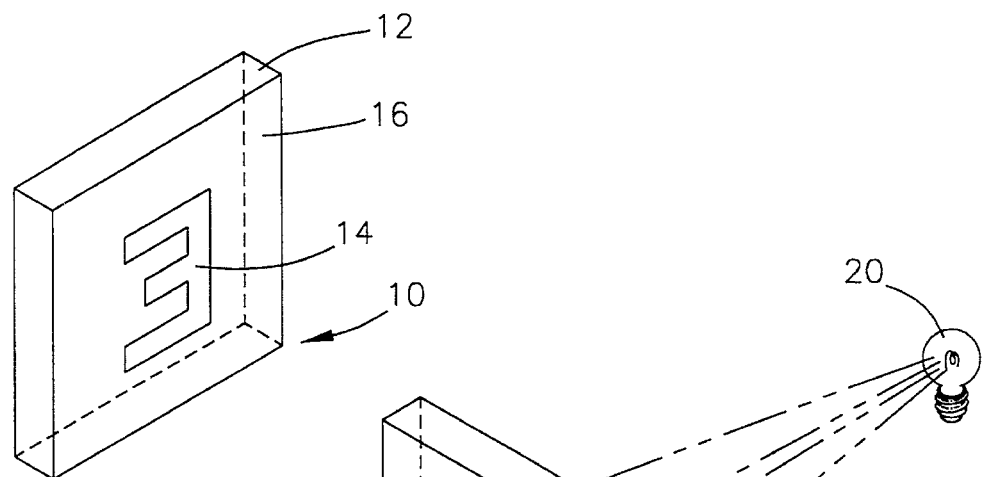
FIGS. 1 and 2 are perspective views of the backside and frontside, respectively, of a button for use in a backlit display in accordance with a first embodiment of this invention.
Figure 2:
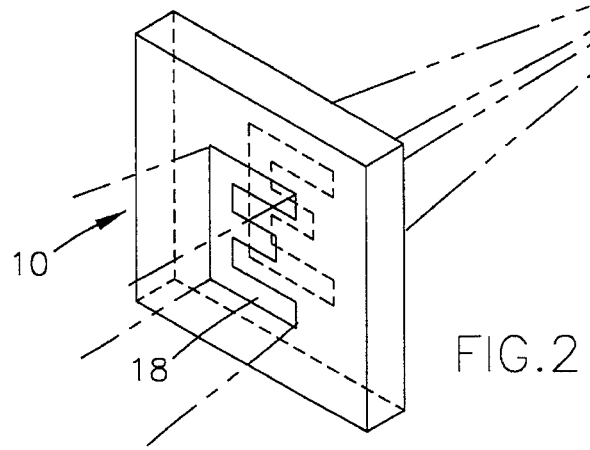

With reference to FIGS. 1 and 2, the method of this invention is directed toward the manufacture of a component such as a button 10 of the type used in an illuminated graphic display (not shown). Such a display can serve as an interior control of an automobile instrument panel, though numerous other applications are possible. The method entails a process by which the button 10 can be manufactured so as to produce an illuminated graphic image 18 when the button 10 is appropriately backlit by a suitable light source 20, as represented in FIG. 2.

In accordance with this invention, the graphic image 18 is created through the use of laser energy, and does not rely on paints, inks or coatings that would introduce hazardous chemicals into the manufacturing environment.

For illustrative purposes, the button 10 is shown in FIGS. 1 and 2 as being a single square component of nominal thickness. Those skilled in the art will recognize that the above representation is merely illustrative, in that numerous possible configurations and geometries are possible for backlit buttons. In that the specific shape and size of the button 10 is not a feature of this invention, and since the numerous possible variations in its design are generally within the knowledge and skill of those skilled in the art, the button 10 illustrated in the Figures is not to be considered a physical limitation on the scope of the invention.

The button 10 is primarily composed of a lens 12 formed from a suitable translucent or transparent material. Polycarbonates and acrylics are widely used for this purpose in the prior art, though it is foreseeable that other materials could be used, such as styrene-acrylonitrile (SAN), acrylonitrile-butadiene-styrene (ABS), or another moldable and non-opaque thermoplastic or thermoset that can be pigmented. A particularly suitable material is a polycarbonate resin available under the name LEXAN 141/ML 5252 from GE Plastics.

In accordance with this invention, the lens material includes a dispersion of pigmentation that is reactive to laser energy. As a result, upon exposure to laser energy, the treated pigmentation will cause the transparent material of the lens 12 to be locally overheated and become substantially optically opaque, thereby substantially preventing light from being transmitted through the treated regions of the lens 12.

A suitable pigmentation for this purpose is mica with or without additional pigments. A particularly suitable and commercially available pigmentation is Afflair Lazer Flair Pigments, available from EM Industries, Chemicals and Pigments Division of Hawthorne, N.Y. This particular pigmentation can be used in quantities of up to about 10 weight percent, and preferably about 0.1 to about 5 weight percent of the lens material in order to achieve satisfactory results without degrading the translucency of the lens material.

Using the pigment-laden lens material described above, the graphic image 18 shown in FIG. 2 can be generated for the button 10 by selectively exposing a portion of the button 10 to laser energy from a suitable source, such as a YAG laser. As shown in FIGS. 1 and 2, a portion 16 of a rear surface of the button 10 has been treated with a laser beam, as represented by the shaded region. The remaining, unexposed portion 14 of the surface delineates an insignia, here a mirror image of the letter "E", though any image could obviously be created. As used herein, the rear surface of the button 10 is that surface which will face the light source 20 after the button 10 is installed in its display, and is therefore opposite the surface that will be visible when the button 10 is installed. It has been determined that only one surface need be exposed to laser energy during treatment in order to form a sufficiently sharp graphic image 18 on the button 10.

Because the laser may result in a roughened surface under some circumstances, it is generally preferable to expose the rear surface, though it is foreseeable that the front surface could be treated for many applications. As noted above, the exposed portion 16 of the rear surface becomes substantially opaque upon sufficient exposure to laser energy, while the remaining portion 14 of the button 10 remains unaffected, and therefore substantially transparent. As such, the unexposed and exposed portions 14 and 16 of the button 10 cooperate to produce the graphic image 18 when the button 10 is backlit with the light source 20, as depicted in FIG. 2.

In practice, it has been found that a Nd:YAG laser emitting energy at 1064 nanometers, or a $CO_2$ laser emitting energy at 10.6 micrometers, is well suited for producing the desired effect on the exposed portion 16 of the button 10 when using the preferred pigmentation. It is foreseeable that other types of lasers and different wavelengths could be used for different lens materials and pigmentation, as long as the laser wavelength is appropriately matched to the pigmentation. Accordingly, preferred pigmentation for use with this invention will have a high absorption coefficient for the laser wavelength intended to be used.

Several passes of the laser beam may be necessary to achieve the desired opacity for the graphic image 18, depending on the thickness of the button 10, the loading of the pigmentation, the type of pigmentation used, and the operational settings for the laser, including power (watts) applied.

Figure 3:
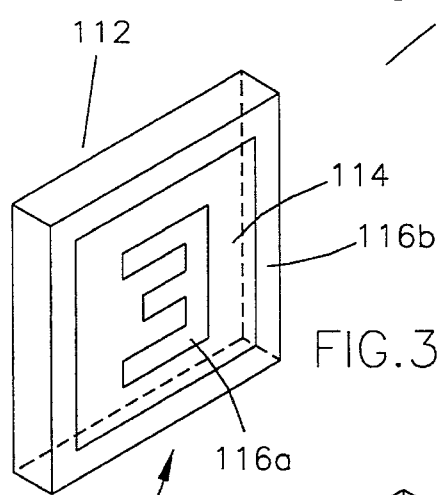
FIGS. 3 and 4 are perspective views of the backside and frontside, respectively, of a button for use in a backlit display in accordance with a second embodiment of this invention.
Figure 4:
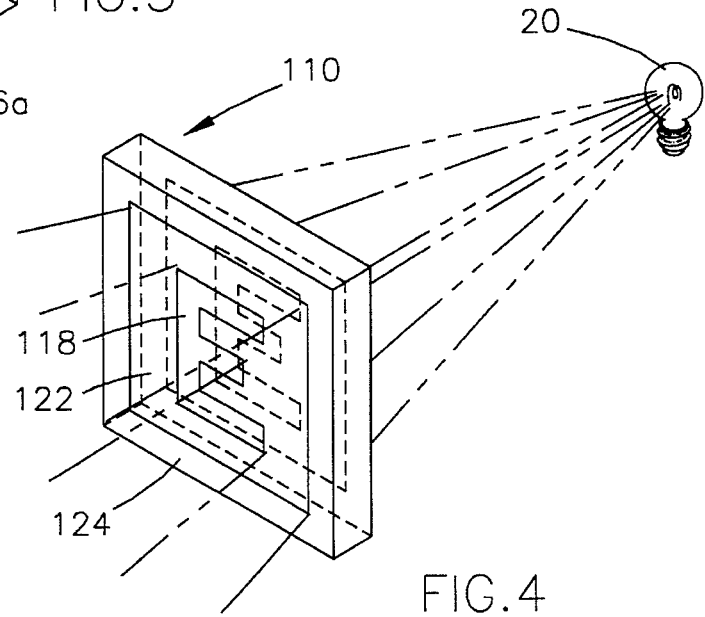

In accordance with this invention, either exposed or unexposed portions of a button 110 can form a graphic image 118, as represented in FIGS. 3 and 4. Specifically, the rear surface of a lens 112 can be exposed to laser energy such that a first exposed portion 116a generates a mirror image of the desired graphic image 118, and a second exposed portion 116b generates a border, while an intermediate unexposed portion 114 separates the two exposed portions 116a and 116b. As a result, when the button 110 is backlit with a suitable light source 20, the graphic image 118 appears as a darkened region on the front surface of the button 110.

Furthermore, the graphic image 118 is surrounded by an illuminated region 122 enclosed within a darkened border 124. From this embodiment, it can be appreciated that various styling effects can be achieved using the method of this invention.

Depending on the lens material and pigmentation used, the graphic images 18 and 118 of the buttons 10 and 110 may not be visible unless the buttons 10 and 110 are backlit. However, the graphic images 18 and 118 can be rendered visible without backlighting if the clarity of the lens material is formulated to have a higher transparency, such that available light entering from the front of the button is sufficient to illuminate the button and delineate its graphic image.

A series of tests were conducted to evaluate the response of the LEXAN 141/ML 5252 polycarbonate material laden with Afflair mica black pigment when treated using a neodymium:YAG (Nd:YAG) laser acousto-optically Q-switched at selected repetition rates. Pigment loadings of about 0.1, 0.5, 1.0 and 1.5 weight percent were employed for samples molded to thicknesses of about 0.9, 1.1, 1.4 and 1.8 millimeters. These samples were then treated with laser energy in order to determine the treatment parameters under which the pigmentation would respond.

Prior to treatment, the samples loaded with 0.1 weight percent pigmentation had a slightly darkened appearance due to the presence of the pigmentation. The samples tended to suitably respond within three or four passes of a laser beam produced by an excitation frequency of about 4 kilohertz with about 1 watt of average power applied to the sample. As viewed from the unexposed side of the samples, the response was a distinct darkening of the transmissive background as a result of the treated regions of the samples becoming substantially dark and opaque. These samples were deemed to be excellent for buttons in which the rear surface is lased to define a graphic image.

The samples loaded with 0.5 weight percent pigmentation had a darker appearance due to the higher pigmentation loading. These samples tended to respond more suitably to four of five passes of a one kilohertz laser beam with about 1 watt of average power applied to the sample. The higher load of pigment resulted in more energy being absorbed, such that the treated polycarbonate material was not darkened, but instead was whitened as a result of melting and foaming of the material immediately surrounding the pigment particles. These samples were deemed to be best suited for buttons in which the rear surface is lased to define the graphic image.

The 1.0 weight percent samples did not respond as fully to the laser treatment used on the 0.1 weight percent samples, but responded to three to four passes of a 35 kilohertz, 3 to 3.5 watts of average power beam to produce a white mark against a dark background. The response was primarily a foaming action, such that the exposed surface was not well suited to serve as the front surface of a button. The 1.5 weight percent samples responded dimly to the 35 kilohertz laser beam used on the 1.0 weight percent samples. Foaming again occurred, such that the treated surface was not suited for use as a front surface of a button.

From the above, it can be appreciated that the method of this invention is capable of producing a backlit component, such as a button or key, without the use of any hazardous chemicals or substances that contain hazardous ingredients. Specifically, the method of this invention does not rely on the use of paints, inks and coatings to create a graphics image, as do techniques known in the prior art. Instead, the method of this invention utilizes the unique reactivity of certain pigmentation to laser energy to produce a graphics image on the surface of a backlit component. Advantageously, such pigmentation has been found to generate sufficiently opaque regions upon exposure to laser energy, while being present in sufficiently small quantities so as to have minimal effect on the transparency of the unexposed portions of the component.

Another significant advantage of this invention is that the method avoids additional processing steps, such as printing, drying, coating and curing steps generally necessitated by prior art methods. In addition, the method of this invention does not complicate the molding of a backlit component by requiring the use of in-mold decoration foils or insert-molded films. Essentially, only three steps are required—preparation of the mold material by dispersing the pigmentation within the polymeric material, molding the material, and then lasing the molded component, each of which are relatively uncomplicated procedures that can be readily incorporated into a mass-production operation. Notably, buttons requiring different graphic images can be molded with the same mold and subsequently finished individually during the lasing operation.

While our invention has been described in terms of a preferred embodiment, it is apparent that other forms could be adopted by one skilled in the art, for example by adopting processing methods other than those suggested here, or by substituting appropriate materials. Accordingly, the scope of our invention is to be limited only by the following claims.

The embodiments of the invention in which an exclusive property or privilege is claimed are defined as follows:

1. A method for producing a graphic for a backlit component, the method comprising the steps of:

forming the backlit component from a substantially transparent polymeric material in which pigmentation is dispersed, the pigmentation being reactive to laser energy, the backlit component having a front surface for display and a back surface for facing a light source; and selectively exposing a portion of the backlit component to laser energy such that the portion becomes substantially opaque while remaining portions of the backlit component are not exposed to the laser energy and thereby remain substantially transparent, the portion and remaining portions cooperating to produce the graphic for the backlit component when the backlit component is backlit with the light source.

2. A method as recited in claim 1 wherein the pigmentation has a relatively high absorption coefficient to the wavelength of the laser energy.

3. A method as recited in claim 1 wherein the pigmentation is present in the polymeric material in quantities of up to about 10 weight percent.

4. A method as recited in claim 1 wherein the remaining portions define an insignia of the graphic.

5. A method as recited in claim 1 wherein the portion defines an insignia of the graphic.

6. A method as recited in claim 1 wherein the polymeric material is a transparent thermoplastic or thermoset resin.

7. A method as recited in claim 1 wherein the exposing step comprises treating the back surface of the backlit component.

8. A method as recited in claim 1 wherein the portion and remaining portions cooperate to produce the graphic for the backlit component only when the backlit component is backlit with the light source.

9. A method as recited in claim 1 wherein the graphic is visible for daytime viewing without backlighting by the light source.

10. The backlit component produced by the method recited in claim 1.

11. A method for producing a graphic for a backlit component, the method comprising the steps of:

molding the backlit component from a substantially transparent polymeric material in which pigmentation is dispersed, the pigmentation having a relatively high absorption coefficient to a wavelength of laser energy so as to be reactive to the laser energy, the backlit component having a front surface for display and a back surface for facing a light source; and selectively exposing a portion of the back surface of the backlit component to the laser energy such that the portion becomes substantially opaque while remaining portions of the back surface of the backlit component are not exposed to the laser energy and thereby remain substantially transparent, the remaining portions defining an insignia of the graphic.

12. A method as recited in claim 11 wherein the pigmentation is present in the polymeric material in quantities of about 0.1 to about 5 weight percent.

13. A method as recited in claim 11 wherein the portion and remaining portions cooperate to produce the graphic for the backlit component only when the backlit component is backlit with the light source.

14. A method as recited in claim 11 wherein the graphic is visible for daytime viewing without backlighting by the light source.

15. The backlit component produced by the method recited in claim 11.

16. A method for producing a graphic for a backlit component, the method comprising the steps of:

molding the backlit component from a substantially transparent polymeric material in which pigmentation is dispersed, the pigmentation having a relatively high absorption coefficient to a wavelength of laser energy so as to be reactive to the laser energy, the backlit component having a front surface for display and a back surface for facing a light source; and selectively exposing a portion of the back surface of the backlit component to the laser energy such that the portion becomes substantially opaque while remaining portions of the back surface of the backlit component are not exposed to the laser energy and thereby remain substantially transparent, the portion and remaining portions cooperating to produce the graphic for the backlit component when the backlit component is backlit with the light source, the portion defining an insignia of the graphic.

17. A method as recited in claim 16 wherein the pigmentation is present in the polymeric material in quantities of about 0.1 to about 5 weight percent.

18. A method as recited in claim 16 wherein the portion and remaining portions cooperate to produce the graphic for the backlit component only when the backlit component is backlit with the light source.

19. A method as recited in claim 16 wherein the graphic is visible for daytime viewing without backlighting by the light source.

20. The backlit component produced by the method recited in claim 16.

\* \* \* \* \*